(12) United States Patent
Verhaeghe

(10) Patent No.: US 6,805,233 B2
(45) Date of Patent: Oct. 19, 2004

(54) CONVEYOR SLAT OF A FIBER REINFORCED THERMOPLASTIC MATERIAL

(75) Inventor: Jan Verhaeghe, Beveren (BE)

(73) Assignee: Groep Stevens International, Lokeran (BE)

( * ) Notice: Subject to any disclaimer, the term of this patent is extended or adjusted under 35 U.S.C. 154(b) by 29 days.

(21) Appl. No.: 10/386,016

(22) Filed: Mar. 11, 2003

(65) Prior Publication Data

US 2004/0108188 A1 Jun. 10, 2004

(30) Foreign Application Priority Data

Dec. 10, 2002 (EP) ............................................. 02447250

(51) Int. Cl.[7] ............................................. B65G 25/00
(52) U.S. Cl. .................. 198/750.6; 414/525.1
(58) Field of Search .......................... 198/750.2, 750.3, 198/750.5, 750.6; 414/525.1, 525.9

(56) References Cited

U.S. PATENT DOCUMENTS 5,222,593 A * 6/1993 Quaeck .................... 198/750.5

* cited by examiner

Primary Examiner—Joseph E. Valenza
(74) Attorney, Agent, or Firm—Frommer Lawrence & Haug; Mark W. Russell

(57) ABSTRACT

The invention relates to a reciprocating slat conveyor comprising a plurality of side by side disposed elongated conveyor slats, means for attaching the slats to at least one of a plurality of longitudinally spaced apart transversely extending drive beams for driving the reciprocating movement of the slats connected thereto, wherein each slat comprises an elongated plank-like upper portion having an upper and a lower surface, at least one leg extending in longitudinal direction of the slat and depending from the lower surface of the slat, the at least one leg being positioned substantially central of the upper portion, the connecting means for connecting the slat to the guide beam being provided to exert a gripping action upon opposite sides of the substantially centrally disposed leg.

21 Claims, 4 Drawing Sheets

CONVEYOR SLAT OF A FIBER REINFORCED THERMOPLASTIC MATERIAL

RELATED APPLICATIONS

This application claims priority to European Patent Application No. 024475250.8, filed Dec. 10, 2002, herein incorporated by reference.

BACKGROUND OF THE INVENTION

1. Field of the Invention

The present invention relates to a reciprocating slat conveyor according to the preamble of the first claim. The present invention also relates to a slat for use with such a reciprocating slat conveyor.

2. Description of the Related Art

The use of reciprocating conveyors in trucking, waste hauling and shipping industries, where the reciprocating floors are used to load and unload cargo or transported commodities to assist personnel performing the loading or unloading operations, is well known in the art. To accomplish these tasks, the reciprocating conveyor usually comprises a plurality of elongated conveyor slats disposed side-by-side, edge to edge, lengthwise of the conveyor. The slats are divided in groups of three slats and sets of slats. Each group of slats includes a slat from the first set, positioned next to a slat from the second set, which in turn is positioned next to a slat from the third set. The slats of a particular set are driven by a common transverse drive beam, which in turn is connected to a corresponding drive unit. The drive units are operated to move the transverse drive beams with the slats, in unison, over a predetermined stroke length in a first direction, so as to convey a load in that first direction. Thereafter, each drive unit is operated in the opposite direction to retract all slats belonging to a particular set, one set at a time. When moving the slats in unison, over a predetermined stroke length in a first direction, the load carried by the conveyor is moved in that direction. By non-uniformly retracting the slats in a return stroke in groups of three slats, the load remains in place and does not move in the direction of retraction.

From U.S. Pat. No. 6,013,585 a conveyor slat is known, comprising a body of a fibre reinforced thermosetting resin. The slat includes an outer surface portion made of thermoplastic material. The slat is produced by passing a reinforcement fabric, the thermosetting resin and the thermoplastic material through a pulltrusion die with a heated section. The thermoplastic material may be applied for example by adding some thermoplastic material to the thermosetting resin impregnation bath, by spraying on the reinforcing fabric, after it has been soaked with thermosetting resin, by combining thermoplastic fibres with the reinforcing fabric etc. The heating causes the thermoplastic material to melt and to form a thermoplastic surface layer on the slat. Later, this thermoplastic surface layer may be further bonded to a thermoplastic veil.

Conventional slats for use with a reciprocating conveyor are disclosed for example in U.S. Pat. No. 5,447,222 to Foster. The slats disclosed in U.S. Pat. No. 6,019,215 are elongated members formed by the process of extrusion or co-extrusion. Each slat comprises a plank-like upper portion, which in turn is divided into three sections, opposite sides of a centre section being flanked by side portions. At the position where the centre section meets a side portion, each time a leg extends form the lower surface of the upper portion. Each depending leg comprises a bottom flange, the bottom flanges pointing either towards each other, away from each other or in opposite directions. The bottom flanges are provided to engage the guide beam to which the slat is confined, to prevent upward movement of the slat relative to the guide beam. Each plank-like upper portion has a lower bearing surface that is positioned to contact an upper surface of the guide beam to directly and support the slat on the guide beam in a slideable manner.

When driving the slats, the displacement implied to the guide beam is transferred to the slats along the contact surface of the guide beam with the slat. With the slats of U.S. Pat. No. 5,447,222 this means that the driving force implied by the guide beam is transferred to the slats along the bottom flanges and from the upper bearing surface of the guide beam to the lower bearing surface of the plank-like upper portion.

U.S. Pat. No. 5,588,522 relates to a reciprocating conveyor floor for palletised loads. This conveyor floor comprises (i) a plurality of laterally spaced-apart conveyor slats mounted on a support frame for longitudinal reciprocation between "start" and "advanced" positions, and (ii) a plurality of laterally spaced apart holding slats for vertical movement between an "up" and a "down" position in which the holding slats are located respectively above and below the conveyor slats, the movement of the holding slats being restricted solely to a vertical movement. With the holding slats in the down position, the conveyor slats support and convey the load as the conveyor slats move from their "start" to their "advanced" position. After the conveyor slats reach their advanced positions, the holding slats are raised to the "up" position, thereby lifting the load from the conveyor slats. The holding slats comprise an upper plank-like portion, a centrally depending leg with bottom flanges which are supported and driven by a lifting tube, the centrally disposed leg having a smaller length than the intermediate legs disposed sideways thereof.

There is however a need to a conveyor floor with improved transfer of the driving forces from the drive beam to the slats.

OBJECTS OF THE INVENTION

Figure 1:
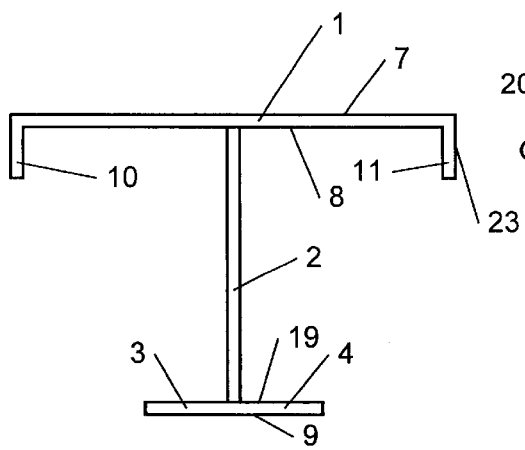
FIG. 1 is a cross section of a slat of the present invention.

It is therefore an aim of the present invention to provide a reciprocating conveyor with which an improved transfer of forces from the drive beam to the slat may be assessed.

SUMMARY OF THE INVENTION

This and other objects are achieved with the present invention with the technical features characterised by a reciprocating slat conveyor comprising a plurality of side by side disposed elongated conveyor slats, means for attaching the slats to at least one of a plurality of longitudinally spaced apart transversely extending drive beams for driving the reciprocating movement of the slats connected thereto, characterised in that each slat comprises an elongated plank-like upper portion having an upper and a lower surface at least one leg extending in longitudinal direction of the slat and depending from the lower surface of the slat, the at least one leg being positioned substantially central of the upper portion, the connecting means for connecting the slat to the guide beam being provided to exert a gripping action upon opposite sides of the substantially centrally disposed leg.

DETAILED DESCRIPTION OF THE INVENTION

The reciprocating slat conveyor of this invention comprises a plurality of side by side disposed elongated conveyor slats and means for connecting the slats to at least one of a plurality of longitudinally spaced apart transversely extending drive beams for driving the reciprocating movement of the slats mounted to the drive beams. Each slat comprises an elongated plank-like upper portion having an upper and a lower surface, at least one leg extending in longitudinal direction of the slat and depending from the lower surface of the slat. The at least one leg is positioned substantially central of the upper portion.

In the slat conveyor of this invention the connecting means for connecting the slat to the guide beam are provided to exert a gripping action upon opposite sides of the substantially centrally disposed leg. The gripping action exerted to the leg acts in longitudinal and height direction of the slat. As in the slat conveyor of the present invention gripping forces are exerted in a direction parallel to the direction in which the slats are moved, the tendency of the end parts of the slats to flip either upwards or downwards may be reduced to a minimum. This is an important advantage as no additional means have to be provided to keep the slats in their horizontal position. Exerting the driving forces in a direction parallel to the direction in which the slats are moved has the advantage that an improved guiding of the displacement of the slats may be achieved, as the driving forces act in a direction parallel to the guiding action exerted by the guide beams. Exerting the driving forces to the depending leg allows optimising transfer of the driving force from the drive beam to the load, as the force transfer applies close to the bearing surface of the slat.

As the driving forces do not act in transverse direction of the upper portion of the slat, the risk to expansion of the slat in transverse direction at the position of the wings, may be minimised. Thereby the risk that side faces of the wings of adjacent conveyor slats contact each other, causing unwanted friction forces to arise, may simultaneously be minimised.

The connecting means for connecting the slat to the guide beam preferably comprise a clamping device for receiving and releasable clamping opposite sides of the substantially centrally disposed leg, as this facilitates mounting of the slats to the conveyor. The releasable connection facilitates insertion and positioning of the slat in longitudinal direction of the conveyor.

According to a preferred embodiment, the clamping device comprises first and second clamping means that are displaceable towards and from each other so as to provide for a releasable clamping of the slat between them.

To improve the gripping action exerted to the slat, the clamping means are further provided to act upon an edge between the substantially centrally disposed leg and bottom flanges extending in transverse direction of the slat and in opposite directions from the leg. Driving forces exerted by the drive beam may thus act simultaneously along two perpendicular surfaces. This allows improving the force transfer from the guide beam towards the slat and minimising the energy needed for conveying the slat.

To minimise the risk that any load carried by the slats ends up below the slats, opposite longitudinal sides of the slat comprise a downwardly extending wing portion, this wing portion having a height that is substantially smaller than the height of the centrally disposed leg. At least one of the wing portions, but preferably both comprise at a position pointing away from the centrally disposed leg a sealing member, which protrudes from the outer surface in the direction of an adjacent slat and is made of a flexible material. Sealing members mounted to adjacent wing portions of adjacent slats are preferably shifted in height direction with respect to each other, to improve the sealing effect and to facilitate mounting.

The present invention also relates to a conveyor slat for use with the above described slat conveyor.

The use of a thermoplastic composite material for manufacturing a conveyor slat allows overcoming major drawbacks existing with the known slats made of thermosetting composite materials. Thermoplastic composites present the advantage that they can be formed into a wide variety of shapes, even after the composite material has left the pulltrusion device. As there is no need to take into account any curing, the time frame for forming and thus the formability of the composite material is greatly improved. Thermoplastic composites further present the advantage that they show an improved elongation at break, improved impact resistance and are less brittle. The lower weight of thermoplastic materials allows reducing the weight of the slat conveyor, as a consequence of which a higher load may be carried by the conveyor, as it is the total weight of the conveyor containing vehicle that must be driven by a truck and is controlled by government regulation.

From U.S. Pat. No. 5,301,798 to Wilkens, a conveyor slat made of extruded thermoplastic poly vinyl chloride polymer is known. Extruded thermoplastic slats have the disadvantage that it may be easily bent, also in cross direction of the slat.

The invention is further elucidated in a non-limiting manner in the accompanying figures and description of the figures.

As can be seen from FIG. 1, the slat S of the present invention comprises a slat body having a plank like upper portion 1 and a substantially centrally disposed leg 2 depending from the upper portion. The upper portion comprises an upper face 7 and a bottom face 8. The centrally depending leg 2 comprises first and a second bottom flanges 3, 4 which protrude in opposite directions from the leg 2, in transverse direction of the slat S. Each flange comprises an upper face 19 pointing towards the upper portion 1 of the slat and a bottom face 9 opposite the upper face.

Opposite sides of the slat, taken in transverse direction of the slat, may be provided with one or more downwardly depending wings 10, 11, showing a reduced length as compared to the central leg 2. The end parts of the wing portions are provided to co-operate with and to engage a corresponding longitudinal recess in the upper surface of a guide beam. Thus, the wing portions assist in guiding the displacement of the slats, in minimising the risk to bending of the slats as well as in minimising the risk that particles of the carried load enter the space between the guide beam and the conveyor slat.

Each wing 10, 11 has at a side pointing away from the central leg 2, an outer face 23. To provide an optimum sealing between adjacent slats, the outer surfaces of the wings 10, 11 may comprise one or more sealing members 20, 21. The sealing members may be made of any suitable material that is sufficiently flexible to allow the sealing member to adapt itself to the space existing between the adjacent slats. Preferred materials have a good wear resistance as they should be able to resist wearing as a consequence of slats moving with respect to each other. Preferred materials also have a sufficiently low friction coefficient. Examples of materials suitable for use as a sealing member include TPU, ethylene/acrylate salt copolymer, polypropylene, polyethylene, Delrin acetal resin, etc.

The first and second bottom flange 3, 4 may take various shapes, depending on the intended use. The flanges 3, 4 may either be substantially flat, or comprise (i) a leg 13, 14 protruding from the bottom flange towards the upper portion 1 to improve contact with the guide beam, or (ii) one or more protrusions protruding from the upper face 19 of the bottom flanges towards extending the upper portion 1 to minimise friction forces between the guide beam and the conveyor slat, or (iii) one or more protrusions protruding from the bottom face 9 of the bottom flanges 3, 4 and co-operating with corresponding grooves in the guide beam to guide the sliding displacement of the conveyor slats with respect to the guide beam.

Figure 2:
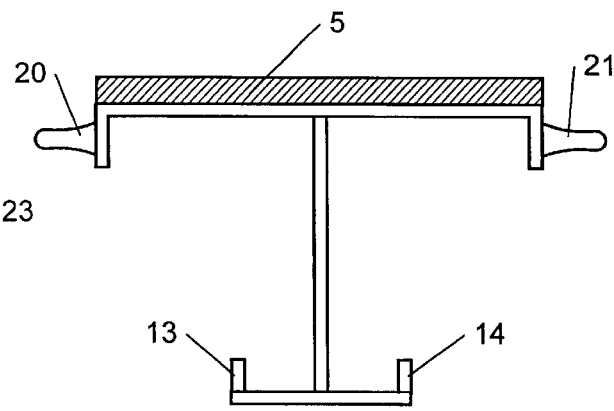
FIGS. 2, 3, 4, show a cross section of preferred embodiments of the slat of the present invention, the slats being provided with a co-extruded top layer.
Figure 3:
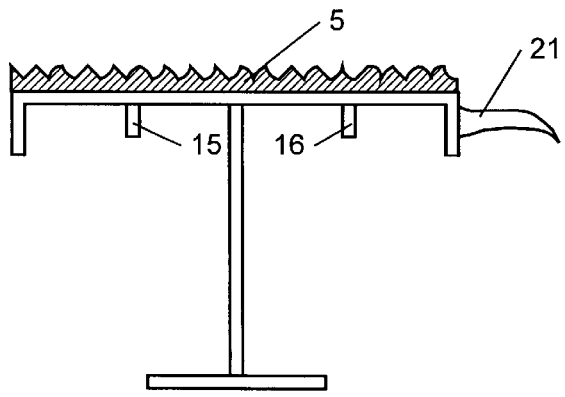
Figure 4:
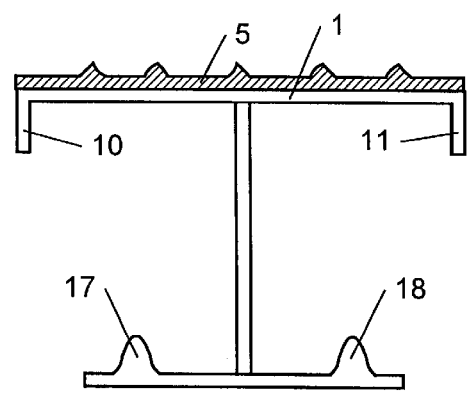
Figure 5:
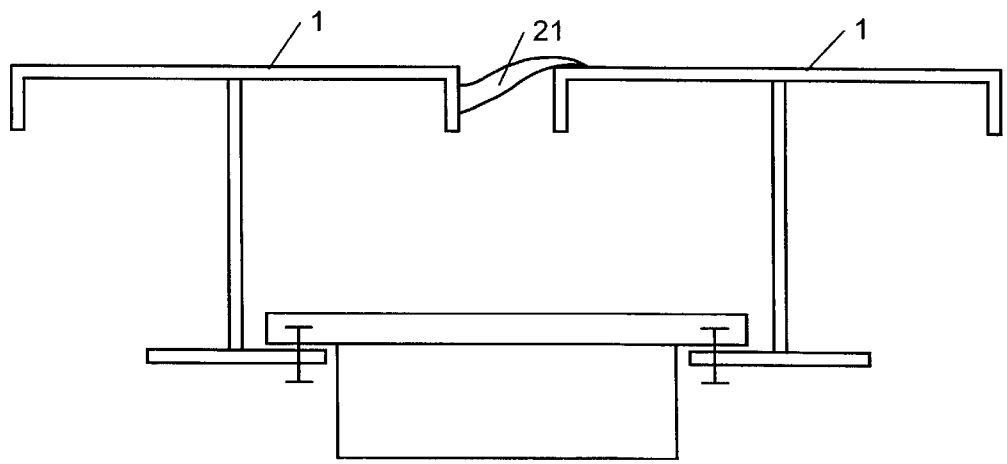
FIG. 5 is a cross section of a pair of two adjacent slats mounted to a conveyor.

To improve the grip to a load carried by the slats S, the upper face 7 of the upper portion 1 of the slats S is preferably covered with a material 5 having a high surface roughness. This may for example be achieved by co-extrusion of a second thermoplastic material. The surface of this material 5 may take various forms and may as is shown in FIGS. 2–4 comprise protrusions adapted to the nature of the material to be carried. The upper face 7 of the upper portion 1 of the slats S may further be coated with a wear resistant layer, for example a grit.

To prevent particles carried by the slats from entering the space below the upper portion of the slats, i.e. the space preserved for receiving the guiding beams of the conveyor, each slat S is provided with at least one sealing member 20, 21. The sealing member is provided to seal any open space between adjacent slats in a slat conveyor. The sealing member may be mounted to an outer face of the wings 10, 11, such that the end of the sealing member 21 rests on the upper surface of an adjacent slat. In that way mounting of the slats is facilitated.

The present invention also relates to a slat conveyor. A slat conveyor usually comprises a frame with two longitudinal beams extending along the longitudinal sides of the frame. To the longitudinal beams a plurality of transverse drive beams are mounted in a spaced apart relationship for selectively driving the reciprocating movement of the slats connected thereto. To the longitudinal beams also a plurality of transverse guide beams are mounted in a spaced apart relationship, for guiding the movement of the slats in longitudinal direction of the frame.

Figure 6:
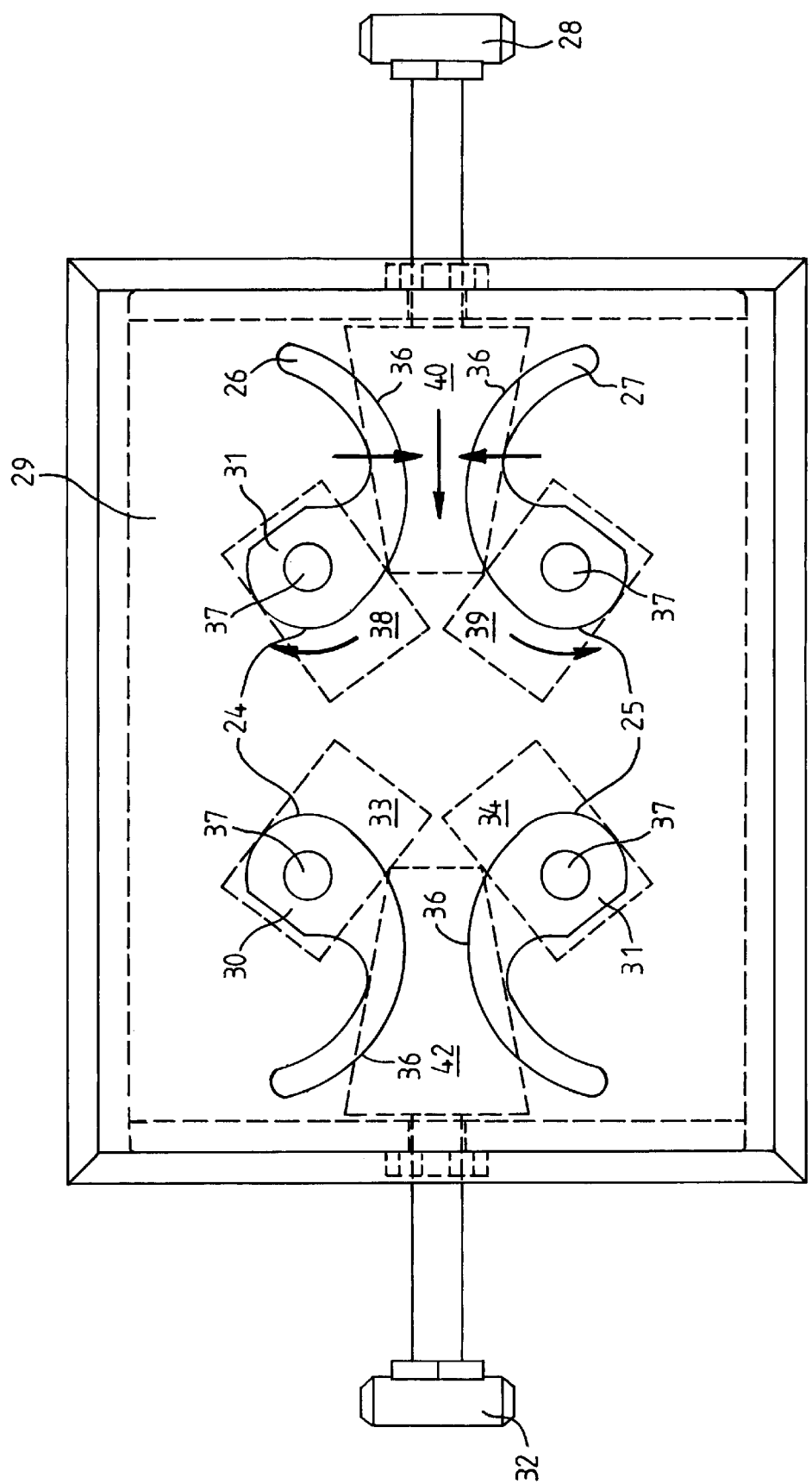
FIG. 6 is a view to the top of a device for connecting a slat to a drive beam.
Figure 7:
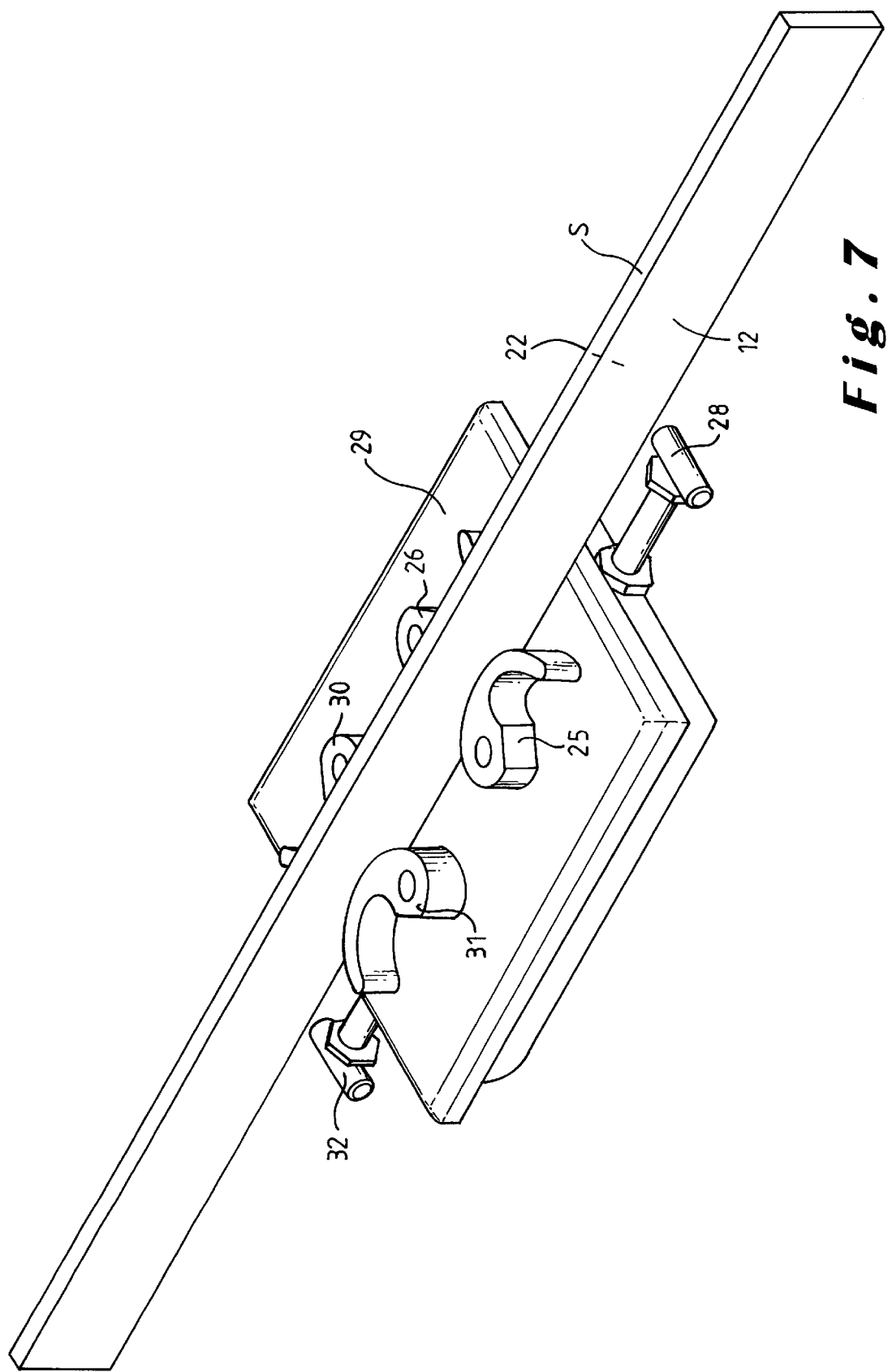
FIG. 7 is a view to the side of a device for connecting a slat to a drive beam.
Figure 8:
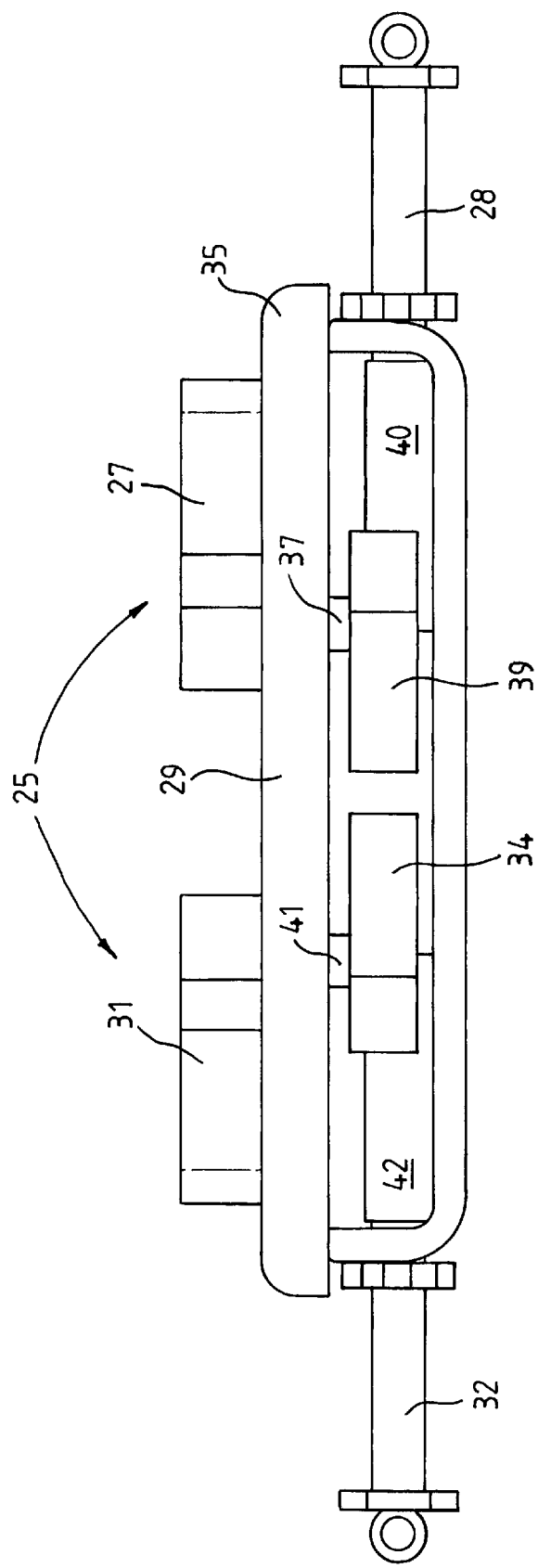
FIG. 8 is a view to the top of a device for connecting a slat to a drive beam with an inserted slat.

The slat conveyor of this invention comprises a plurality of side by side disposed elongated conveyor slats, each slat being attached to one of the drive beams 6. In the slat conveyor of this invention, connecting means 24-32 are provided for connecting the conveyor slats to the drive beams 6, as is shown in FIGS. 6–8. As can be seen from FIG. 8, the connecting means comprise a hollow profile 35, which is provided to be connected to a drive beam. The hollow profile 35 carries on its upper portion 29 the clamping device 24-32. The connecting means and thus the clamping device used in the slat conveyor of this invention may comprise any means provided they act upon the longitudinal sides of the centrally disposed leg 2.

From FIG. 7 it becomes apparent that the connecting means for connecting a slat S to the guide beam 6 preferably comprise a clamping device 24-32 clamping the centrally depending leg 2 in longitudinal direction between them, preferably in a releasable way. The longitudinal clamping ensures optimal transfer of clamping forces and optimal guiding of the slat. As longitudinally extending clamping means, use can be made of any clamping means known to the man skilled in the art.

As can be seen from FIG. 6, in A preferred embodiment of the invention, the clamping device of this invention preferably comprises first and second clamping means 24, 25, which are displaceable towards and from each other. When displaced from each other, a slat may be inserted between the clamping means in an easy manner, restrictions with respect to correct longitudinal positioning of the slat being minimal. The clamping means may be displaced towards each other until their contact surface 36 contacts the longitudinal sides 12, 22 of the slat S. In that position contact surfaces of opposite clamping means exerts a gripping action or a clamping force upon opposite longitudinal sides 12, 22 of the substantially centrally disposed leg 2 of the slat.

According to a preferred embodiment, the clamping means comprise a first and a second profile 26, 27. The first and second profile 26, 27 show a convex contact surface 36 with the substantially central leg 2 of the slat. As can be seen from FIG. 7, the first and second profile 26, 27 are rotatably mounted to the upper portion of the hollow carrier 35 on opposite sides of the leg, in the direction of the arrow. The first and second profile 26, 27 are rotatable around a rotation axis 37. This has the advantage that in case a slat is moved in the rotation direction of the profiles 26, 27, the profiles move towards each other thus increasing the clamping force. To fix the position of the first and second profile 26, 27, the first and second profiles are connected to corresponding first and second blocks 38, 39 which are rotatable with the corresponding profile. A positioning block 40 inserted between opposite blocks 38, 39, fixes the position of the first and second block 38, 39. Block 40 is preferably displaceable with respect to the blocks 38, 39. This may for example be achieved through screw 28. However, any other fixing means and means for displacing the block 40 to position blocks 38, 39, known to the man skilled in the art may be used.

Preferably the clamping means further comprise a third and a fourth profile 30, 31 similar to the first and second profile. However, the third and fourth profile 30, 31 are rotatable in a direction opposite the direction of rotation of the first and second profile, to improve the clamping force in both directions of the reciprocating movement. The third and fourth profile are connected to respectively third and fourth blocks 33, 34. The profiles 30, 31 and blocks 33, 34 are rotatable around a rotation axis 41. Their position may be fixed with positioning block 42.

The slat of the present invention may be made of various materials including, metal, for example steel or aluminium although any other suitable method known to the man skilled in the art may be used, thermoplastic material, fibre reinforced thermosetting resins, for example isophtalic polyester although any other suitable thermosetting resin known to the man skilled in the art may be used. Prior art conveyor slats were mostly produced by the process of pulltrusion of a fibre reinforced thermosetting resin matrix.

Preferred materials in which the slat S of the present invention is made include fibre reinforced thermoplastics. Preferred thermoplastic materials suitable for use with the present invention comprise those thermoplastic materials which depolymerise upon heating and repolymerise upon cooling. Suitable thermoplastic materials are disclosed in U.S. Pat. No. 5,891,560. Preferred thermoplastic materials are thermoplastic urethanes and thermoplastic ureas, thermoplastic polyurethanes being particularly preferred.

The slats of the present invention are preferably made by the process of pulltruding a thermoplastic material, described in U.S. Pat. No. 5,891,560 which is herewith incorporated by reference. According to that process, a fibre bundle from a fibre is pulled from a storage rack through a fibre preheat station, the temperature of which is sufficiently high to remove any water present in the fibres, and to preheat the fibres to a temperature above the solidification point of the resin melt. After having been pre-heated, the fibre bundle is pulled through a fibre pretension unit, comprising an array of pins for spreading out the individual fibres and placing the fibres under tension. Thereafter, the fibre bundle is pulled through an impregnation unit, where the fibre bundle is wetted with the thermoplastic resin melt. To shape the thermoplastic impregnated fibre into slats, the impregnated fibre bundle is pulled through the consolidation unit, which contains a die to shape the fibre bundle and a plurality of wipe-off plates to further shape the fibre bundle into the desired shape of the slat. Each wipe-off plate has an opening with the shape of the slat to be formed, the dimensions of the opening getting smaller downstream of the impregnation unit, until the desired dimensions of the slat are reached. The thus formed slat part is pulled through a cooling die, having the dimensions of the slat to be formed, to solidify the melt and provide a slat with a smooth surface.

Thermoplastic resins that are not DRTPs (Depolymerizable—Repolymerizable thermoplastics) can be used in combination with the DRTP to make the composites of the present invention, provided the non-DRTP is employed at sufficiently low levels that the melt viscosity of the resin remains low enough to efficiently impregnate the fibre bundle. Examples of non-DRTPs include acrylonitrilebutadiene-styrene copolymers, polystyrenes, polyphenylene oxide, polyphenylene oxide polystyrene blends, polyoxymethylenes, polypropylene, polyamides, poly(butylene terephthalate), poly(ethylene terephthalate), polyester copolymers of poly(butylene terephthalate) and poly(ethylene terephthalate), styrene-acrylonitrile copolymers, and ethylene-propylene-diene terpolymers. With thermoplastic composites the risk to release of undesirable volatile compounds into the environment no longer exists and recycling of the composite material is facilitated. As there is no curing involved, enhanced production rates may be achieved.

The thermoplastic composite material of which the slat of this invention is composed may include additives such as for example flame retardants, UV stabilizers, pigments, dyes, anti-static agents, antimicrobals, fungicides, demolding agents, and flow promoters.

The dimensions of the slat of the present invention may vary between wide ranges, but will in general have a somewhat smaller width than the known slats because of the lower bending stiffness of the thermoplastic composite material. Examples of suitable dimensions include 10–20 cm width. It is however possible to increase the width somewhat by providing between the centrally disposed leg 2 and each of the side wings 10, 11, an additionally downwardly depending reinforcement leg 15, 16. The reinforcement legs 15, 16 may have approximately the same height as the wings 10, 11 or a smaller height.

The above description is intended to be illustrative and not limiting. Various changes or modification in the embodiments described herein may occur to those skilled in the art. These can be made without departing from the scope and spirit of the invention.

What is claimed is:

1. A reciprocating slat conveyor comprising a plurality of side by side disposed elongated conveyor slats, means for attaching the slats to at least one of a plurality of longitudinally spaced apart transversely extending drive beams for driving the reciprocating movement of the slats connected thereto, characterised in that each slat comprises an elongated plank-like upper portion having an upper and a lower surface at least one leg extending in longitudinal direction of the slat and depending from the lower surface of the slat, the at least one leg being positioned substantially central of the upper portion, the connecting means for connecting the slat to the guide beam being provided to exert a gripping action upon opposite sides of the substantially centrally disposed leg.

2. A reciprocating slat conveyor as claimed in claim 1, characterised in that the connecting means for connecting the slat to the guide beam comprise a clamping device for receiving and releasably clamping opposite sides of the substantially centrally disposed leg.

3. A reciprocating slat conveyor as claimed in claim 1, characterised in that the clamping device comprises first and second clamping means, displaceable towards and from each other so as to provide for a releasable clamping of the slat between them.

4. A reciprocating slat conveyor as claimed in claim 1, characterised in that the clamping means are further provided to act upon an edge between the substantially centrally disposed leg and bottom flanges extending in transverse direction of the slat and in opposite directions from the leg.

5. A reciprocating slat conveyor as claimed in claim 1, characterised in that the means for connecting the slat to the drive beam further comprise a hollow profile having an upper portion with an upper surface pointing towards the slat and a bottom portion, the clamping means being mounted to the upper portion, the bottom portion being connected to the drive beam.

6. A reciprocating slat conveyor as claimed in claim 3, characterised in that the clamping means comprise a first and a second profile having a convex contact surface with the substantially central leg of the slat, the first and second profile being positioned on opposite sides of the leg and being rotatably mounted to the upper profile, fixing means being provided for fixing the position of the first and second profile to allow clamping the slat between them.

7. A reciprocating slat conveyor as claimed in claim 6, characterised in that the clamping means further comprise a third and a fourth profile having a convex contact surface with the substantially central leg of the slat, the third and fourth profile being positioned on opposite sides of the leg and being rotatably mounted to the upper profile in a direction opposite the direction of rotation of the first and second profile, fixing means being provided for fixing the position of the third and fourth profile to allow clamping the slat between them.

8. A reciprocating slat conveyor as claimed in claim 6, characterised in that the said profiles are made of a plastics or a rubber material.

9. A reciprocating slat conveyor as claimed in claim 1, characterised in that opposite longitudinal sides of the slat comprise downwardly extending wing portions, each wing portion having a height that is substantially smaller than the height of the centrally disposed leg, and in that each wing portion comprises at a position pointing away from the centrally disposed leg an outer surface to which a sealing member is mounted, the sealing member protruding from the outer surface and being made of a flexible material, the sealing members mounted to adjacent wing portions of adjacent slats being shifted in height direction with respect to each other.

10. A conveyor slat for use with a reciprocating slat conveyor as claimed in claim 1, the slat comprising an elongated plank-like upper portion having an upper surface and a lower surface, at least one leg extending in longitudinal direction of the slat and depending from the lower surface of the plank-like upper portion, characterised in that the at least one leg is positioned substantially central of the plank-like upper portion.

11. A conveyor slat as claimed in claim 10, characterised in that the at least one substantially centrally disposed leg comprises a bottom part and at least two bottom flanges, the bottom flanges extending from the substantially centrally disposed leg in transverse direction of the slat, the bottom flanges pointing in opposite directions of the bottom part.

12. A conveyor slat as claimed in claim 10, characterised in that opposite longitudinal sides of the slat comprise downwardly extending wing portions, each wing portion having a height that is substantially smaller than the height of the centrally disposed leg.

13. A conveyor slat as claimed in claim 12, characterised in that each wing portion comprises at a position pointing away from the centrally disposed leg an outer surface and in that to the outer surface of each wing portion a sealing member is mounted, the sealing member protruding from the outer surface and being made of a flexible material.

14. A conveyor slat as claimed in claim 13, characterised in that the sealing members of the wing portions of one slat are shifted with respect to each other, in height direction of the slat.

15. A conveyor slat as claimed in claim 10, characterised in that at least part of the upper surface of the top portion is covered with a layer of a material having a high surface roughness.

16. A conveyor slat as claimed in claim 10, characterised in that at least one of the bottom flanges comprises a protrusion depending from a lower surface of the bottom flange.

17. A conveyor slat as claimed in claim 10, characterised in that the slat is made of a fibre reinforced depolymerisable and repolymerisable thermoplastic material.

18. A conveyor slat as claimed in claim 17, characterised in that the slat is made of a thermoplastic material selected from the group of polyurethane and polyurea.

19. A conveyor slat as claimed in claim 17, characterised in that as a fibre reinforcing material use is made of fibres selected from the group consisting of glass fibres, ceramic fibres, carbon fibres, metal fibres, polymeric fibres having a melting point above the depolymerising and repolymerising temperature of the thermoplastic material and mixtures thereof.

20. A conveyor slat as claimed in claim 10, characterised in that the slat is made of a metal.

21. The conveyor slat as claimed in claim 20, wherein the metal is aluminum.

* * * * *